United States Patent [19]
Labana et al.

[11] 3,939,127
[45] Feb. 17, 1976

[54] POWDER PAINT WITH EPOXY AND AMIDE COPOLYMER AND MIXTURE OF DICARBOXYLIC ACIDS AND POLYANHYDRIDES

[75] Inventors: Santokh S. Labana, Dearborn Heights; Ares N. Theodore, Farmington, both of Mich.

[73] Assignee: Ford Motor Company, Dearborn, Mich.

[22] Filed: Feb. 24, 1975

[21] Appl. No.: 552,456

Related U.S. Application Data

[63] Continuation-in-part of Ser. No. 394,881, Sept. 6, 1973, abandoned.

[52] U.S. Cl............ 260/78.4 D; 260/78.4 EP; 260/80.3 N; 260/80.73; 260/830 R; 260/836; 427/27; 427/386

[51] Int. Cl.²............ C08G 59/42; C08G 81/02; C08F 220/32

[58] Field of Search............ 260/78.4 D, 836

[56] References Cited
UNITED STATES PATENTS

| | | | |
|---|---|---|---|
| 3,752,870 | 8/1973 | Labana | 260/836 |
| 3,781,379 | 12/1973 | Theodore et al. | 260/836 |

Primary Examiner—John Kight, III
Attorney, Agent, or Firm—Olin B. Johnson; Keith L. Zerschling

[57] ABSTRACT

Improved powder paint compositions are disclosed which comprise a particulate mixture of (1) a qualitatively difunctional copolymer of about 5 to about 20 weight percent of a glycidyl ester of a monoethylenically unsaturated acid, about 2 to about 10 weight percent of an alpha-beta olefinically unsaturated amide and about 70 to about 93 weight percent monoethylenically unsaturated monomers consisting essentially of monofunctional monomers selected from the group consisting of esters of a $C_1 - C_8$ monohydric alcohol and acrylic acid, esters of a $C_1 - C_8$ monohydric alcohol and methacrylic acid, and $C_8 - C_{12}$ monovinyl hydrocarbons, (2) a $C_4 - C_{20}$ saturated straight chain, aliphatic dicarboxylic acid which is present in an amount that provides about 0.1 to about 0.6 carboxyl group per functional group on said copolymer, and (3) a polyanhydride, i.e., a homopolymer of a monomeric anhydride of a dicarboxylic acid, having molecular weight in the range of about 1,000 to about 5,000 which is present in an amount that provides about 0.2 to about 1.1 anhydride groups per epoxy group on said copolymer.

5 Claims, No Drawings

POWDER PAINT WITH EPOXY AND AMIDE COPOLYMER AND MIXTURE OF DICARBOXYLIC ACIDS AND POLYANHYDRIDES

This application is a continuation-in-part of application Ser. No. 394,881 filed Sept. 6, 1973, now abandoned.

BACKGROUND OF THE INVENTION

Powder coating compositions are extremely desirable for use in painting substrates in that they are essentially free of organic solvents conventionally utilized in liquid paint systems. Thus, they give off little, if any, volatile material to the environment when heat cured.

Powder coating compositions comprising (1) a copolymer of a glycidyl acrylate and other monofunctional olefinically unsaturated monomers, (2) an anhydride crosslinking agent, and (3) a polymeric flow control agent were heretofore described in U.S. Pat. No. 3,781,379 issued Dec. 25, 1973 to S. S. Labana and A. N. Theodore, the inventors herein.

Powder coating compositions comprising (1) a copolymer of a glycidyl acrylate and other monofunctional olefinically unsaturated monomers, (2) a dicarboxylic acid crosslinking agent, and (3) a polymeric flow control agent were heretofore described in U.S. Pat. No. 3,752,870 to S. S. Labana, a coinventor herein.

Powder coating compositions comprising (1) a copolymer of a glycidyl acrylate and other monofunctional olefinically unsaturated monomers, (2) a crosslinking agent comprising a mixture of a monocarboxylic acid and a dicarboxylic acid, and (3) a polymeric flow control agent were heretofore described in U.S. Pat. No. 3,730,930 to Santokh S. Labana, a coinventor herein.

Powder coating compositions comprising (1) a copolymer of a hydroxy acrylate and other monofunctional olefinically unsaturated monomers, (2) a crosslinking agent selected from anhydrides, dicarboxylic acids, and melamines and (3) a polymeric flow control agent were heretofore described in copending U.S. Pat. application Ser. No. 407,128 filed Oct. 17, 1973 by Santokh S. Labana, a coinventor herein and Yun F. Chang.

THE INVENTION

It now has been discovered that powder paints having certain unexpected advantages relative to the aforedescribed powder paints compositions can be obtained by converting the qualitatively monofunctional (epoxy functional) copolymer to a qualitatively difunctional (epoxy and amide functional) copolymer and employing such difunctional copolymer in combination with a combination of crosslinking agents, i.e., a dicarboxylic acid and a polyanhydride.

Substitution of the polyanhydride for a portion of the dicarboxylic acids which otherwise would be required provides a powder paint having improved leveling characteristics and further characterized by increased gel time and increased adhesion.

Further improvement in the homogeneity of the powders can be obtained by having the copolymer both epoxy-functional and hydroxy-functional. Such powders can be cured at lower temperatures and provide coatings having improved mechanical properties and solvent resistance. This provides the copolymer with both a difference in functional groups and an increase in total functionality and increased polarity. The latter provides, in combination with the crosslinking agents, a higher degree of compatibility (aiding homogeneous mixing) of the complete coating composition including pigment dispersion.

These powders are effectively prepared by spray drying in that they resist phase separation. They may also be processed by melt blending and vacuum drying techniques. They are easily and effectively mixed by extrusion or mill rolling.

The functionality of the copolymer is provided by constituent epoxy-functional acrylates and methacrylates and hydroxy-functional acrylates and methacrylates. For simplicity, except in those instances wherein a specific compound is named, the term "acrylate" is used in this specification to include esters of both acrylic and methacrylic acid, i.e., acrylates and methacrylates.

DETAILED DESCRIPTION OF THE INVENTION

The epoxy and amide functional copolymers used in the practice of this invention contain between about 5 and about 20, preferably between 8 and 15, weight percent of a glycidyl ester of a monoethylenically unsaturated carboxylic acid, e.g., glycidyl acrylate and glycidyl methacrylate, about 2 to about 10 weight percent of an alpha-beta olefinically unsaturated amide and about 70 to about 93 weight percent monoethylenically unsaturated monomers selected from the group consisting of esters of a $C_1 - C_8$ monohydric alcohol and acrylic acid, esters of a $C_1 - C_8$ monohydric alcohol and methacrylic acid and $C_8 - C_{12}$ monovinyl hydrocarbons such as styrene, vinyl toluene, t-butyl styrene, chlorostyrene and alpha methyl styrene. The preferred amides are acrylamide and methacrylamide. In the preferred embodiment in excess of 50 weight percent of such monofunctional, monoethylenically unsaturated monomers are esters of a $C_1 - C_8$ monohydric alcohol and either acrylic or methacrylic acid. Other vinyl monomers such as vinyl chloride, acrylonitrile, methacrylonitrile and vinyl acetate may be used as modifying monomers. When employed these monomers comprise about 0 to about 30 weight percent of the monomer mixture but, ordinarily, the remainder monomers will consist exclusively of the aforementioned esters of a $C_1 - C_8$ monohydric alcohol and acrylic or methacrylic acid or a mixture of such esters and $C_8 - C_{12}$ monovinyl hydrocarbons.

These copolymers have a glass transition temperature in the range of 40° to 90°C., preferably between 50°C. and 80°C., and a molecular weight ($\bar{M}_n$) in the range of about 1500 to about 15,000, preferably about 2500 to about 6,000.

When dicarboxylic acids have been used as the sole crosslinking agent for epoxy-functional copolymers, it has been found advantageous to employ the acid in an amount such that about 0.3 to about 1.2 carboxyl groups are present for each epoxy group in the copolymer.

In this invention, a portion of the dicarboxylic acid crosslinking agent is replaced by a functionally equivalent amount of a polyanhydride. Thus, a mixture of the prepolymer and crosslinking agent in accordance with this invention advantageously contains the dicarboxylic acid in an amount sufficient to provide about 0.1 to about 0.6 carboxyl groups per functional group on the prepolymer and the polyanhydride in an amount sufficient to provide about 0.2 to about 1.1 anhydride groups per same.

These powder coating compositions include as crosslinking agents for the aforedescribed copolymers saturated, straight chain, aliphatic, dicarboxylic acid containing 4 to 20 carbon atoms per molecular.

The preferred dicarboxylic acids are those containing from 5 to 13 carbon atoms per molecule. In still greater detail, the most desirable acids are adipic acid, pimelic acid, suberic acid, azelaic acid, sebasic acid, undecanoic acid and brassylic acid.

The preferred polyanhydrides are poly (adipic anhydride), poly (azelaic anhydride), and poly (sebasic anhydride) but others having molecular weight up to about 5000 are useful. Those having molecular weight in the range of about 1,000 to about 2500 are preferred.

These powder coating compositions advantageously contain a flow control agent as a part of the powder coating mixture. The flow control agent is a polymer having a molecular weight ($\overline{M}_n$) of at least 1000 and comprises at least 0.05 weight percent of the mixture. The flow control agent has a glass transition temperature at least 20°C. below the glass transition temperature of the mixture's copolymer.

One group of suitable flow control agents are acrylic polymers. Preferred acrylic polymers which may be used for the flow control agent are polylauryl acrylate, polybutyl acrylate, poly (2- ethylhexyl acrylate), polylauryl methacrylate and polyisodecyl methacrylate.

The flow control agent may also be a fluorinated polymer having a surface tension, at the baking temperature of the powder, lower than that of the copolymer utilized in the mixture. Preferred flow control agents, if the agent is a fluorinated polymer are esters of polyethyleneglycol or polypropyleneglycol and fluorinated fatty acids. For example, an ester of polyethyleneglycol of molecular weight of over 2500 and perfluoro octanoic acid is a useful flow control agent. Polymer siloxanes of molecular weight of over 1000 (advantageously 1,000 to 20,000) may also be useful as flow control agents, e.g., poly (dimethyl siloxane) or poly (methylphenyl) siloxane.

A coating composition formed in accordance with the teachings of this invention may include a small weight percent of a catalyst in order to increase the crosslinking rate of the powder coating composition at the baking temperature thereof. Baking temperatures will ordinarily be in the range of 130° to 200°C. and the catalyst should produce a gel time for the powder coating composition at the baking temperature to be used which is at least 1 minute but no greater than 20 minutes. This gel time is preferably in the range of 1 to 12 minutes and most preferably between about 2 and about 8 minutes.

Some catalysts which are suitable for use in the powder coating compositions include tetraalkylammonium salts, imidazole type catalyst, tertiary amines and metal salts of organic carboxylic acids. The tetraalkylammonium salt catalysts include the following: tetrabutyl ammonium chloride (bromide or iodide), tetraethyl ammonium chloride (bromide or iodide), trimethylbenzylammonium chloride, dodecyl dimethyl (2-phenoxyethyl) ammonium bromide, diethyl (2-hydroxy ethyl) methyl ammonium bromide. Suitable catalysts of the imidazole type include: 2-methyl-4-ethyl imidazole, 2-methyl imidazole, imidazole, 2 - [(N-benzylanilino) methyl] - 2 - imidazoline phosphate, and 2 - benzyl - 2 - imidazoline hydrochloride. Suitable tertiary amine catalysts for the powder coating compositions of this invention include: triethylenediamine, N,N - diethylcyclohexylamine, and N-methyl morpholine. The metal salts of organic carboxylic acid which are catalysts for the powder coatings of this invention include, but are not limited to: stannous octoate, zinc naphthenate, cobalt naphthenate, zinc octoate, stannous 2 - ethylhexoate, phenylmercuric propionate, lead neodecanoate, dibutyl tin dilaurate and lithium benzoate.

The catalyst used in an individual powder coating composition is generally solid at room temperature and has a melting point of from 50° to 200°C.

Conventional non-metallic and metallic pigments can be used with these powder coating compositions. Such are conventionally employed in an amount such as to constitute between about 6 and 35 weight percent of the total mixture depending on the pigment selected and the gloss required for the baked coating.

Since individual powder coating compositions of this invention can be applied to an article to be painted by electrostatic methods, one may desire to include a small weight percentage of an antistatic agent in such compositions. In particular, the antistatic agent is included in a range from 0.05 weight percent of the total powder composition. Suitable antistatic agents include, but are not limited to, tetraalkylammonium salts as discussed previously and which also serve as catalysts. Other suitable antistatic agents include: alkyl-poly (ethyleneoxy) phosphate or alkylauryl poly (ethyleneoxy) phosphates as, for example, ethyl benzyl poly (ethyleneoxy) phosphate; polyethyleneimine, poly (2-vinyl pyrollidone), pyridinium chloride, poly (vinyl pyridium chloride), polyvinyl alcohol or inorganic salts.

A plasticizer may be used in a powder coating composition of this invention if desired. The type of plasticizers used very often include adipates, phosphates, phthalates, sebacates, polyesters derived from adipic acid or azelaic acid, and epoxy or epoxidized plasticizers. Some of these plasticizers are: dihexyl adipate, diisooctyl adipate, dicyclohexyl adipate, triphenylphosphate, tricresylphosphate, tributylphosphate, dibutylphthalate, dioctylphthalate, butyl octyl phthalate, dioctyl sebacate, butyl benzyl sebacate, dibenzyl sebacate, butanediol - 1,4 - diglycidyl ether, diglycidyl ether of bisphenol A and its polymers and cellulose acetate butyrate.

Having described the various materials which are employed in formulating the powder coating compositions of this invention, a plurality of examples are hereinafter set forth to illustrate various individual powder coating compositions. In each examples, the molecular weight of the copolymer is between 1500 to 15,000 and the glass transition temperature of the copolymer is between 40° and 90°C.

EXAMPLE 1

An epoxy-functional and amide-functional copolymer is prepared from the below listed components in the manner hereinafter set forth:

| Reactants | Amounts, grams | Percent by Weight Of Total Reactants |
| --- | --- | --- |
| Glydicyl methacrylate | 45 | 15 |
| Acrylamide | 15 | 5 |
| Butyl methacrylate | 111 | 37 |

-continued

| Reactants | Amounts, grams | Percent by Weight Of Total Reactants |
|---|---|---|
| Methyl methacrylate | 129 | 43 |

In this polymerization, 11.0 grams of 2,2'-azobis(2-methylpropionitrile), hereinafter called AIBN, are mixed with the monomer mixture. The monomer mixture (solution) is added slowly to about 200 ml of toluene heated to 80°–90°C. which is being stirred vigorously under a nitrogen atmosphere. A condenser is provided at the top of the toluene container to condense the toluene vapors and return the condensed toluene to the container. The monomer mixture is added through a regulating valve and the rate of addition is controlled to maintain a reaction temperature of 90°–110°C. with the rest of the heat supplied from an external heater. After the addition of the monomer mixture is completed (3 hours), 0.8 grams of AIBN dissolved in 10 ml acetone is added over a ½ hour period and refluxing is continued for 2 additional hours.

The resultant toluene-polymer solution is diluted with 200 mls. acetone and coagulated in 2 liters of hexane. The white powder is dried in the vacuum oven at 55°C. for 24 hours. Its molecular weight is determined to be $\overline{M}_w/\overline{M}_n = 6700/3200$ and WPE (molecular weight per epoxide group) is about 1000.

The dry copolymer, hereinafter called Copolymer A, is mixed with the following ingredients in the proportions hereinafter set forth to form a coating powder.

| Ingredients | Amounts, grams |
|---|---|
| Copolymer A | 50.0 |
| Poly (azelaic anhydride) | 4.80 |
| Azelaic acid | 2.40 |
| Titanium dioxide | 4.50 |
| Ferrite Yellow | 4.00 |
| Poly (2-ethylhexylacrylate) — $\overline{M}_n = 11000$ | 0.42 |

This mixture is ball-milled for 5 hours and mill rolled for 10 minutes at 110°C. Subsequently, the cooled material is granulated and converted to a particle size range of 5–30 microns with a fluid energy mill. This powder demonstrates excellent non-caking characteristics, is uniform in appearance, and demonstrates a high gel time.

This powder is sprayed electrostatically on a grounded steel panel by using an electrostatic powder spray gun operating at 50 KV charging voltage. The powder coated panels are cured at 160°C. for 20 minutes.

The cured coatings have good adhesion to the steel panels. They also have good impact strength and are not soluble in xylene, toluene, methyl ethyl ketone, or gasoline. The appearance of these coated surfaces is excellent and free of "orange peel" effect.

EXAMPLE 2

Powder coating materials of Example 1 including the copolymer and all other ingredients are dispersed in 45 mls. toluene and reduced with acetone to a homogeneous mixture containing 30% total solids. After processing this mixture with a spray dryer, a powder is obtained that contained less than 1.5% solvent.

This powder is deposited on steel panels as in Example 1 and cured at 160°C. for 25 minutes. The resulting coating has good solvent resistance and appearance.

EXAMPLE 3

The procedures of Example 1 are repeated except that a functionally equivalent amount of glycidyl acrylate is substituted for the glycidyl methacrylate used to form the copolymer.

EXAMPLE 4

The procedures of Example 1 are repeated except for the difference that a functionally equivalent amount of adipic acid is substituted for the azelaic acid in the coating material formulation.

EXAMPLE 5

The procedures of Example 1 are repeated except for the difference that a functionally equivalent amount of pimelic acid is substituted for the azelaic acid in the coating material formulation.

EXAMPLE 6

The procedures of Example 1 are repeated except for the difference that a functionally equivalent amount of suberic acid is substituted for the azelaic acid in the coating material formulation.

EXAMPLE 7

The procedures of Example 1 are repeated except for the difference that a functionally equivalent amount of sebacic acid is substituted for the azelaic acid in the coating material formulation.

EXAMPLE 8

The procedures of Example 1 are repeated except for the difference that a functionally equivalent amount of undecanoic acid is substituted for the azelaic acid in the coating material formulation.

EXAMPLE 9

The procedures of Example 1 are repeated except for the difference that a functionally equivalent amount of brassylic acid is substituted for the azelaic acid in the coating material formulation.

EXAMPLE 10

The procedures of Example 1 are repeated except for the difference that a functionally equivalent amount of poly (adipic anhydride) is substituted for the poly (azelaic anhydride) in the coating material formulation.

EXAMPLE 11

The procedures of Example 1 are repeated except for the difference that a functionally equivalent amount of poly (sebasic anhydride) is substituted for the poly (azelaic anhydride) in the coating material formulation.

EXAMPLE 12

The procedures of Example 1 are repeated except for the differences that the composition of the copolymer and the composition of the complete coating material differ as hereinafter set forth.

The composition of the copolymer, hereinafter called Copolymer B, is as follows:

| Reactants | Amounts, grams | Percent By Weight Of Total Reactants |
|---|---|---|
| Glycidyl methacrylate | 45 | 15 |
| Methacrylamide | 6 | 2 |
| Butyl methacrylate | 120 | 40 |
| Methyl methacrylate | 129 | 43 |

The composition of the coating material of this example is as follows:

| Ingredients | Amounts, grams |
|---|---|
| Copolymer B | 50.00 |
| Poly (azelaic anhydride) | 8.50 |
| Azelaic Acid | 1.10 |
| Titanium dioxide | 4.50 |
| Ferrite yellow | 4.00 |
| Poly (2-ethylhexyl acrylate), $\overline{M}_n = 9000$ | 0.42 |

EXAMPLE 13

The procedure of Example 1 is repeated except for the differences that the composition of the copolymer and the composition of the complete coating material differ as hereinafter set forth.

The composition of the copolymer, hereinafter called Copolymer C, is as follows:

| Reactants | Amounts, grams | Percent By Weight Of Total Reactants |
|---|---|---|
| Glycidyl methacrylate | 16 | 8 |
| Methacrylamide | 20 | 10 |
| Butyl methacrylate | 84 | 42 |
| Methyl methacrylate | 80 | 40 |

The composition of the coating material in this example is as follows:

| Ingredients | Amounts, grams |
|---|---|
| Copolymer C | 50.00 |
| Poly (azelaic anhydride) | 3.00 |
| Azelaic acid | 1.60 |
| Titanium dioxide | 4.50 |
| Ferrite yellow | 4.00 |
| Poly (2-ethylhexyl acrylate), $\overline{M}_n = 11000$ | 0.42 |

EXAMPLE 14

The procedures of Example 1 are repeated with the single difference that an equivalent amount of poly (butyl acrylate) $\overline{M}_n = 9000$, is substituted for the poly (2-ethylhexyl acrylate) flow control agent.

EXAMPLE 15

The procedures of Example 1 are repeated with the single difference that an equivalent amount of poly (lauryl methacrylate), $\overline{M}_n = 6000$, is substituted for the poly (2-ethylhexyl acrylate) flow control agent.

EXAMPLE 16

The procedures of Example 1 are repeated with the single difference that an equivalent amount of poly (isodecyl methacrylate), $\overline{M}_n = 5000$, is substituted for the poly (2-ethylhexyl acrylate) flow control agent.

EXAMPLE 17

The procedures of Example 1 are repeated with the single difference that an equivalent amount of polyethylene glycol perfluoro octonoate, $\overline{M}_n = 3400$, is substituted for the poly (2-ethylhexyl acrylate) flow control agent.

EXAMPLE 18

The procedures of Example 1 are repeated with the single difference that an equivalent amount of poly (methyl siloxane) is substituted for the poly (2-ethylhexyl acrylate) flow control agent.

EXAMPLE 19

The procedures of Example 1 are repeated with the single difference that the flow control agent, poly (2-ethylhexyl acrylate), is reduced from 0.42 grams to 0.25 grams.

EXAMPLE 20

The procedures of Example 1 are repeated with the single difference that the flow control agent, poly (2-ethylhexyl acrylate), is increased from 0.42 grams to 0.75 grams.

EXAMPLE 21

The procedures of Example 1 are repeated with the single difference that the flow control agent, poly (2-ethylhexyl acrylate), is increased from 0.42 grams to 1.5 grams.

The term "polyanhydride" as used herein means a homopolymer of a monomeric anhydride of a dicarboxylic acid.

Many modifications of this invention will be apparent to those skilled in the art in view of this specification. It is intended that all such modifications which fall within the scope of this invention be included within the appended claims.

We claim:

1. In a thermosettable powder paint which exclusive of pigments, catalysts, antistatic agents, plasticizers, and flow control agents, the same being conventional non-reactive additives to the thermosettable powder paint, consists essentially of a coreactive particulate mixture of
   1. a qualitatively difunctional copolymer of about 5 to about 20 weight percent of a glycidyl ester of a monoethylenically unsaturated acid and about 95 to about 80 weight percent of monoethylenically unsaturated monomers and having a glass transition temperature in the range of about 40°C. to about 90°C. and a molecular weight ($\overline{M}_n$) in the range of about 1500 to about 15,000, and
   2. a $C_4 - C_{20}$ saturated, straight chain, aliphatic dicarboxylic acid, the improvement wherein A. said copolymer is qualitatively difunctional and said other monoethylenically unsaturated monomers consist essentially of an alpha-beta olefinically unsaturated amide in an amount comprising about 2 to about 10 weight percent of said copolymer and monofunctional monomers selected from the group consisting of esters of a $C_1 - C_8$ monohydric alcohol and acrylic acid esters of a $C_1 - C_8$ monohydric alcohol and methacrylic acid and $C_8 - C_{12}$ monovinyl hydrocarbons, and B. there is substituted for a portion of said dicarboxylic acid a polyanhydride having molecular weight in the range of about 1000 to about 5000 and the resultant mixture of said dicarboxylic acid and said polyanhydride is proportional and quantified such that said dicarboxylic acid is present in an amount that provides about 0.1 to about 0.6 carboxyl groups per epoxy group on said copolymer and said polyanhydride is present in an amount that provides about 0.2 to about 1.1 anhydride groups per epoxy group on said polymer.

2. A powder paint in accordance with claim 1 wherein said alpha-beta olefinically unsaturated amide is selected from amides consisting of acrylamide and methacrylamide.

3. A powder paint in accordance with claim 1 wherein said glycidyl ester is an ester selected from the group consisting of glycidyl acrylate and glycidyl methacrylate.

4. A powder paint in accordance with claim 1 wherein said polyanhydride has molecular weight in the range ($\overline{M}_n$) in the range of about 1000 to about 2500.

5. A powder paint in accordance with claim 1 wherein said copolymer has molecular weight ($\overline{M}_n$) in the range of about 2500 to about 6000.

* * * * *